Oct. 5, 1937.  L. C. BECKER  2,095,165

CULTIVATOR ATTACHMENT

Filed Oct. 29, 1936

Inventor

*Louis C. Becker*

By *L. F. Landrufh*

Attorney

Patented Oct. 5, 1937

2,095,165

UNITED STATES PATENT OFFICE 2,095,165

CULTIVATOR ATTACHMENT

Louis C. Becker, Eitzen, Minn.

Application October 29, 1936, Serial No. 108,293

2 Claims. (Cl. 97—203)

This invention relates to a cultivator attachment particularly adapted to coact with a cultivator shovel when used in cultivating corn or the equivalent, so as to prevent the soil from passing over the shovel and falling onto the small corn, to prevent injury thereto and covering thereof, and also to provide such an attachment as will break the clods of soil and permit the same to roll under the cultivator and cover the small weeds rather than the corn.

It is usually sufficient to use such an attachment on the first and sometimes on the second cultivation of the corn or the like and the invention further aims to provide such a structure as may be used as an attachment on existing models.

The more specific objects and advantages will become apparent from a consideration of the description following taken in connection with the accompanying drawing illustrating an operative embodiment.

In said drawing:—

Figure 1:
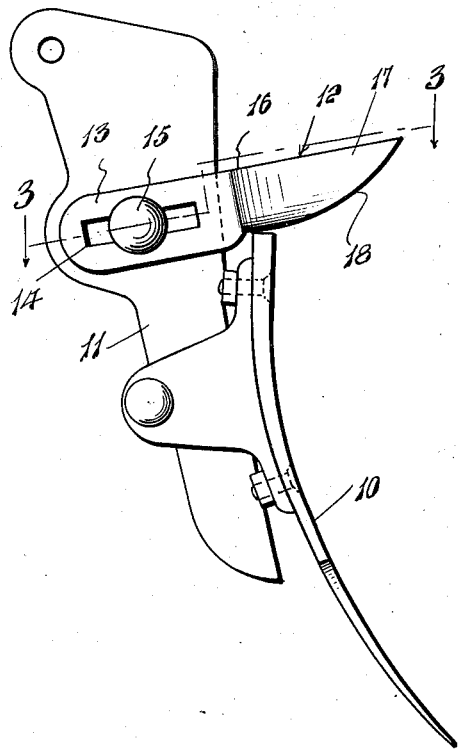
Figure 1 is a side elevation showing my improvements applied to a cultivator shovel.
Figure 2:
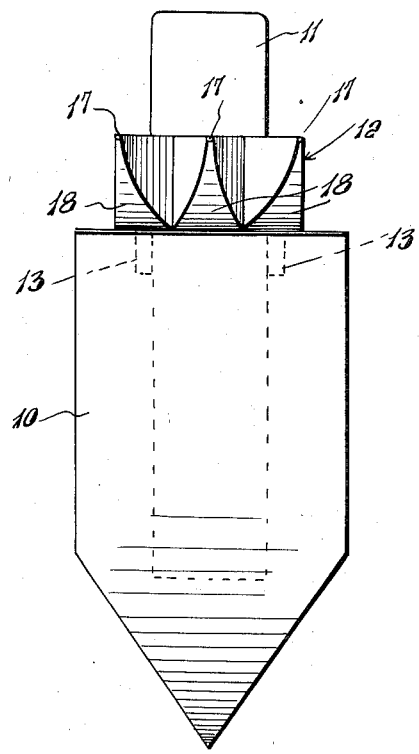
Figure 2 is a front elevation of the parts of Figure 1.
Figure 3:
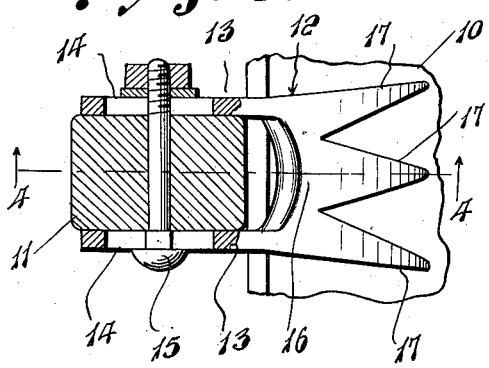
Figure 3 is a cross sectional view taken on the line 3—3 of Figure 1.
Figure 4:
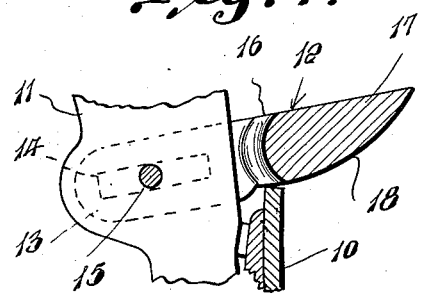
Figure 4 is a detail section taken on the line 4—4 of Figure 3.

Referring specifically to the drawing wherein like reference characters designate like or similar parts, 10 designates a conventional cultivator shovel such as is detachably carried by a standard or support 11. Usually the improvements are attached to riding cultivators and they have a plurality of the supports 11, each of which is equipped with a shovel such as 10.

My improvements comprise a bifurcated body shown at 12, the bifurcation providing attaching arms 13, engaging opposite sides of the support and each arm having an elongated slot 14 engaged by a removable bolt 15 passing detachably through an opening in the support. The elongated slots 14 in combination with the bolt 15 permit adjustment of the attachment.

Extending forwardly from the bridge portion of the attachment 16, are a series of spurs 17, the same preferably having their under surfaces convex as shown at 18 and which surfaces, adjacent the rear end, rest on the upper end of the shovel 10, to coact with the bolt in holding the attachment or body in operative position.

With the device in use, soil which rises or travels up the shovel will strike the spurs 17, and thus be prevented from passing over the upper end of the shovel and falling onto corn being cultivated. Large clods, will be effectively broken through impact with the spurs 17 and will fall to the ground without danger of covering the young corn or the equivalent.

Various changes may be resorted to provided they fall within the spirit and scope of the invention.

I claim as my invention:—

1. In combination with a shovel and its support, an attachment comprising a body secured to the support and extending forwardly beyond the upper end of the shovel, thereby to prevent passage of soil upwardly over the shovel and to the rear thereof, said body resting on the upper end of the shovel, and having forwardly projecting spurs for engagement by the soil.

2. In combination with a shovel and its support, an attachment comprising a body secured to the support and extending forwardly beyond the upper end of the shovel, thereby to prevent passage of soil upwardly over the shovel and to the rear thereof, said body being bifurcated to provide arms disposed on opposite sides of the support, said arms having elongated slots, and a fastening on the support passing through the said slots.

LOUIS C. BECKER.